(12) United States Patent
Jung

(10) Patent No.: US 8,323,710 B1
(45) Date of Patent: Dec. 4, 2012

(54) METHOD OF FRYING SHRIMP TO MAINTAIN SHAPE THEREOF

(76) Inventor: Eun Ah Jung, Seoul (KR)

(*) Notice: Subject to any disclaimer, the term of this patent is extended or adjusted under 35 U.S.C. 154(b) by 0 days.

(21) Appl. No.: 13/286,278

(22) Filed: Nov. 1, 2011

(30) Foreign Application Priority Data

Mar. 1, 2011 (KR) .................. 10-2011-0018265

(51) Int. Cl.
*A22C 29/02* (2006.01)
*A23L 1/01* (2006.01)
*A23P 1/08* (2006.01)

(52) U.S. Cl. .................. 426/291; 426/438; 426/643
(58) Field of Classification Search .................. 426/291, 426/643, 438
See application file for complete search history.

(56) References Cited

U.S. PATENT DOCUMENTS

| | | | | |
|---|---|---|---|---|
| 4,816,276 A | * | 3/1989 | Blazevich | 426/479 |
| 5,431,938 A | * | 7/1995 | Kou | 426/291 |
| 5,753,286 A | * | 5/1998 | Higgins | 426/92 |
| 5,888,576 A | * | 3/1999 | Nagano | 426/643 |
| 6,723,362 B1 | * | 4/2004 | Rastogi | 426/274 |
| 2003/0161936 A1 | * | 8/2003 | Johnston et al. | 426/643 |

FOREIGN PATENT DOCUMENTS

| | | |
|---|---|---|
| KR | 1020010107833 A | 12/2001 |
| KR | 100880444 B1 | 4/2003 |

* cited by examiner

*Primary Examiner* — Carolyn Paden
(74) *Attorney, Agent, or Firm* — Fox Rothschild LLP

(57) ABSTRACT

A method of frying a shrimp to maintain an original shape includes a first process of forming a plurality of slits in a lower portion of the body part of the shrimp close to a tail part thereof; a second process of removing a back shell of the body; a third process of coating the head part, the body part, plurality of leg parts, and the tail part of the shrimp from which the back shell thereof has been removed, with a powder form of primary batter; a fourth process of coating the shrimp coated with the powder form of primary batter, with a liquid type of secondary batter; and a process operation of introducing the shrimp into a fry container from an end portion of the head part by acute angle when the shrimp coated with the liquid type of secondary batter is put into the fry container.

5 Claims, 6 Drawing Sheets

METHOD OF FRYING SHRIMP TO MAINTAIN SHAPE THEREOF

This invention claims the benefit of Korean Patent Application No. 10-2011-0018265 filed on Mar. 1, 2011, which is hereby incorporated by reference in its entirety.

BACKGROUND OF THE INVENTION

1. Field of the Invention

The present invention relates to a frying method capable of maintaining a shape of a frying material as it is like that in a living state after deep-frying in oil, and more particularly, to a frying method capable of maintaining an original shape of a shrimp after a deep frying thereof in oil by deep frying a shrimp as it is as being gathered in a state in which a shape thereof is maintained, without removing a head part serving as a repository of nutrition and a plurality of legs stuck to the head part and a body part, thereby taking nutrients in all of portions in the shrimp and maintaining the crunch of a shrimp without repulsion in ingesting a fried shrimp.

2. Description of the Related Art

Fried foods in dietary culture have been largely used and included in a category of familiar food life culture.

Shrimps have a difference according to a kind thereof, but a principal ingredient thereof is protein, and when the total weight gravity thereof is 100 g, protein has a gravity of about 20 g. In addition, a shrimp includes a good balance of eight kinds of the essential amino acids including methionine and lysine, and since it contains glycine and betaine, a shrimp provides a specific flavor and smell.

In particular, an ingredient of betaine tastes good and further has robust effects, and also is contained in foods including minerals as well as vitamin B complex such as vitamin B2, vitamin B6, vitamin B12, or the like, and calcium. Also, a shrimp has a high content of cholesterol as compared with other fishes.

Cholesterol contained in a shrimp contains high-density lipoprotein (HDL)-cholesterol beneficial to the human body (arteriosclerosis or myocardial infarction mainly occurs when a low-density lipoprotein (LDL)-cholesterol value is high). In addition, a shrimp contains a large quantity of taurin.

As such, a large amount of nutrients good for the human body are contained in all portions of a shrimp from a head to a tail thereof in the light of shrimp's characteristics.

Therefore, all portions, from a head part to legs and a tail, of a shrimp may be taken at the time of eating the shrimp, such that the human being can ingest all nutrients contained in the shrimp.

However, a shrimp currently used to be fried is used after eliminating a head part and a leg part therefrom due to inconvenience in ingesting or cleaning it even though people are aware of that the shrimp has rich nutrients particularly in the head part and the leg part, and then the shrimp is fried so as for people to take the fried shrimp.

SUMMARY OF INVENTION

An aspect of the present invention provides a method of frying a shrimp, which is capable of maintaining an original shape of the shrimp.

In an existing method of frying a shrimp in oil, the shrimp from which a head part and a leg part have been removed, is fried in oil, and people take the fried shrimp that is provided as only a body thereof, such that people take only the body without the head part and the leg part of the shrimp in a state in which shrimp's particular taste and smell of the head part, the leg part, or the like cannot be provided to people as well as nutrients contained therein. That is, there has been incomplete ingestion when people take a fried shrimp.

In addition, as described above, since after any portion or portions of a head part and a leg part of a shrimp are removed, a fried and processed shrimp cannot be provided with a shape intact in shrimp itself in terms of a commercial value even in a finished product, it is inconsistent with requirements for improvement in the commercial value, that is, loss of appetite.

Therefore, the aspect of the present invention provides a method of frying a shrimp, which is capable of maintaining an original shape of the shrimp. In the method of frying a shrimp according to the aspect of the present invention, a fried shrimp may be provided, maintaining a head part and a plurality of leg parts as they are, instead of a fried shrimp from which a head part and/or a leg part has been removed in the existing frying method. That is, according to the aspect of the present invention, nutritive components contained in shrimp itself may be provided without any inconvenience at the time of eating the fried and processed shrimp, while maintaining the crunch thereof. Further, shrimp inherent taste and smell may be maintained in the fried shrimp and shrimp's shape intact may be seen with naked eyes during eating the fried shrimp, thereby improving appetite and a value of commodities with regard to a fried shrimp.

According to an aspect of the present invention, there is provided a method of frying a shrimp with a shape thereof, to maintain an original shape of the shrimp as it is, the shrimp being processed maintaining a form of the shrimp in which a shell portion in a head part of the shrimp obtained naturally or in aquaculture and internal organs in the head part and a back part of a body part thereof have been removed, the method including: a first processing operation of forming a plurality of slits in a lower portion of the body part of the shrimp at a position close to a tail part thereof; a second processing operation of removing a back shell of the body part and a water gun part of the shrimp; a third processing operation of coating the head part, the body part, a plurality of leg parts, and the tail part of the shrimp from which the back shell thereof has been removed, with a powder form of a primary batter; a fourth processing operation of coating the shrimp coated with the powder form of the primary batter, with a liquid type (liquid state) of a secondary batter; and a fifth processing operation of introducing the shrimp into a french fry container from an end portion of the head part by acute angle when the shrimp coated with the liquid type of the secondary batter is put into the french fry container.

In addition, the first processing operation and the third processing operation may be performed at the same time, or the second processing operation and the third processing operation may be performed at the same time.

The liquid type of the secondary batter of the fourth processing operation may be matured at a normal temperature or in a refrigerated state for 3 to 9 hours.

The shrimp may be fried in the french fry container at an oil temperature ranging from 150 to 250 degrees Celsius for 3 to 5 minutes.

A floor area ratio of the shrimp to be fried may be 80% or less of a section area of the french fry container when a frying operation is once performed in the french fry container.

According to the embodiment of the present invention described above, all nutrients contained in shrimp itself may be provided to people who eat the fried and processed shrimp, and the inherent shape of a shrimp in a living state may be maintained as it is after the frying process.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Hereinafter, a frying method according to an embodiment of the present invention will be described with reference to the accompanying drawings showing respective processing operations.

Figure 1:
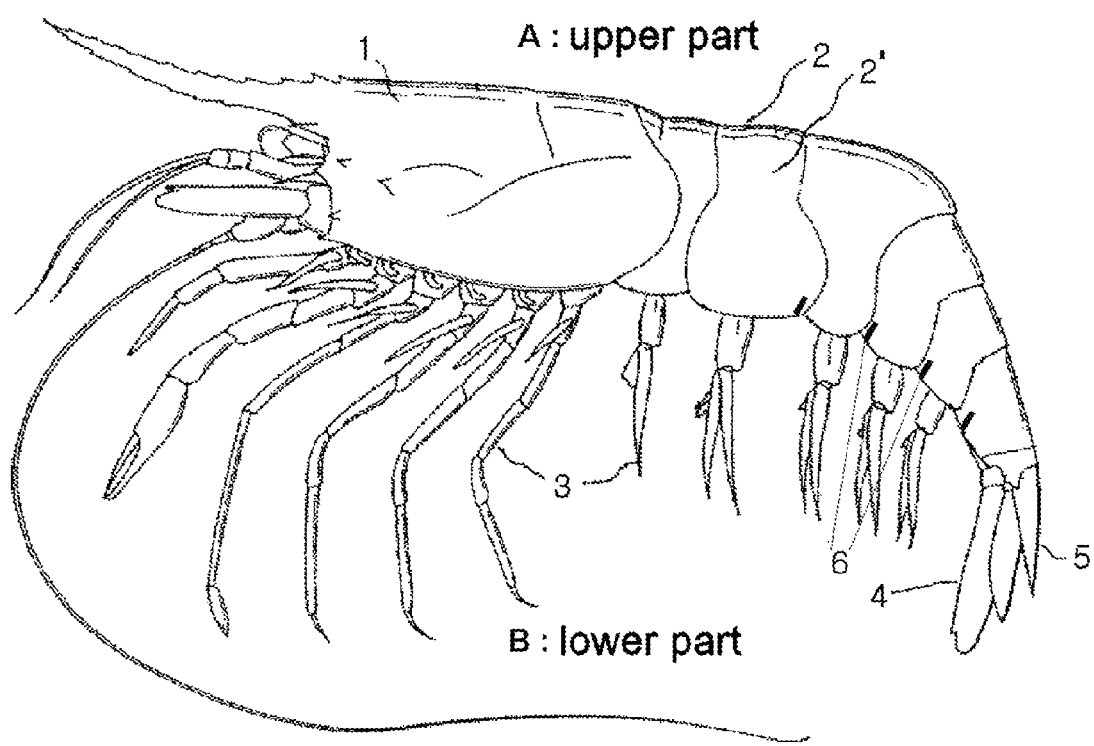
FIG. 1 is a view showing main parts of a shrimp.
Figure 2:
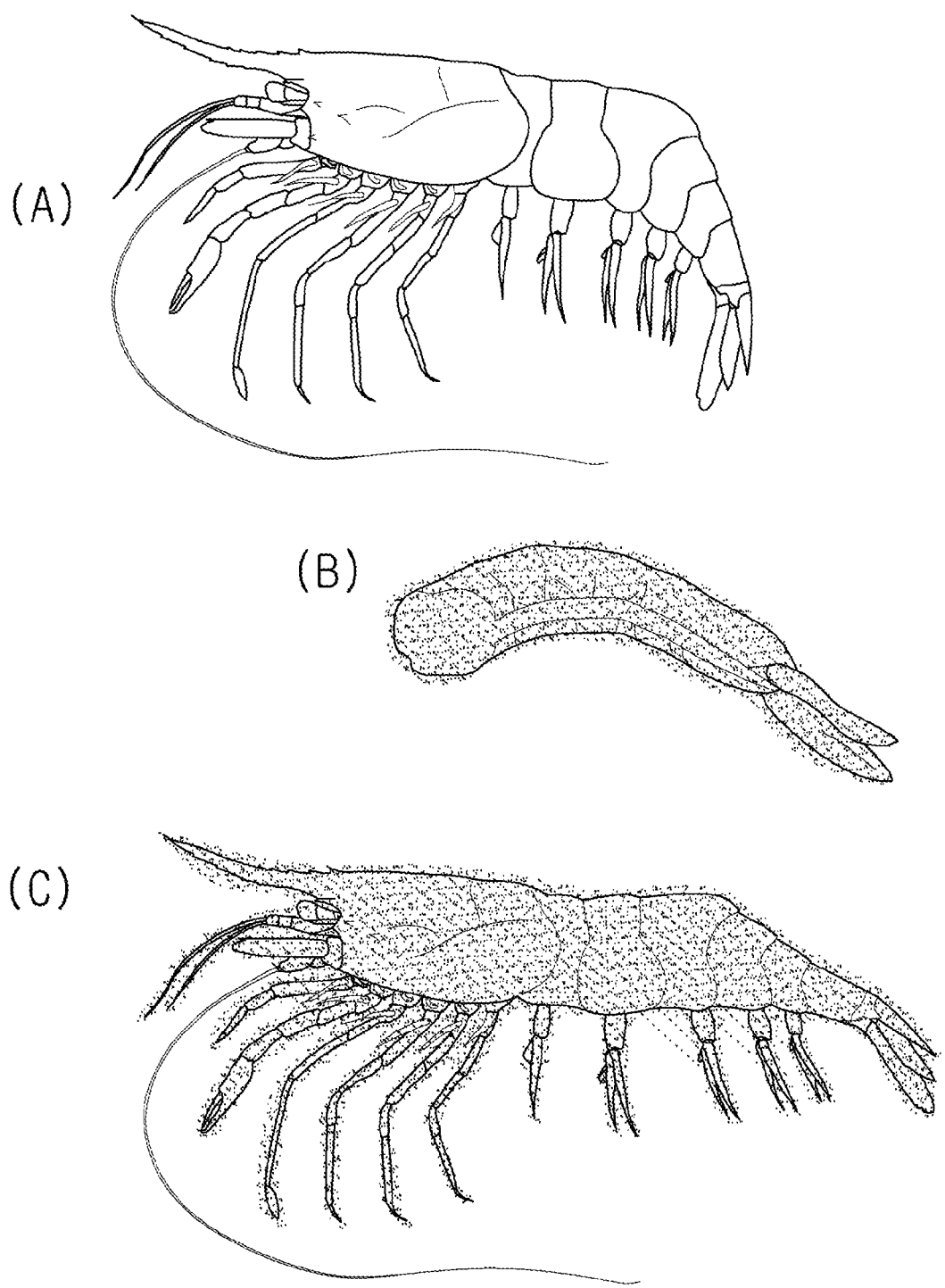
FIGS. 2(A), 2(B) and 2(c) shows depictions second and three processing operations.
Figure 3:
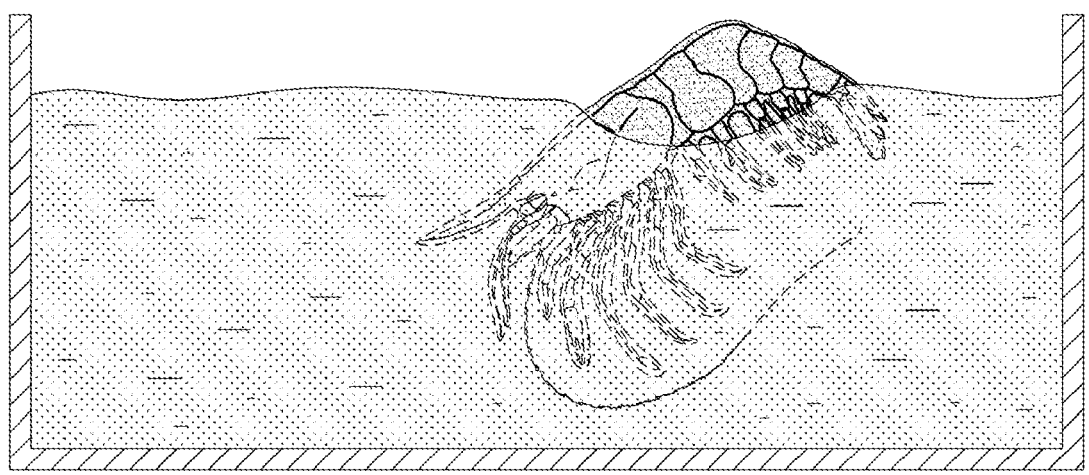
FIG. 3 shows a depiction for a fourth processing operation.
Figure 4:
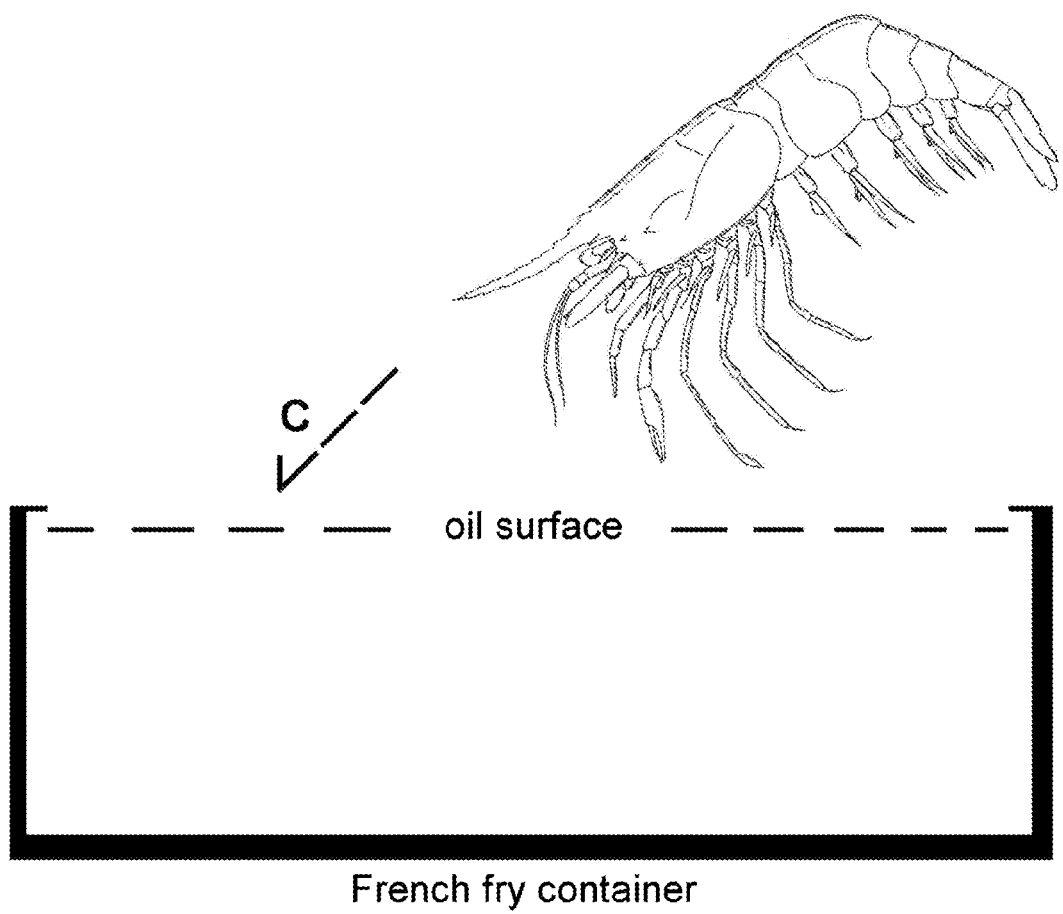
FIG. 4 is a reference diagram for explaining a fifth processing operation in which a shrimp is introduced into oil according to an embodiment of the present invention.
Figure 5:
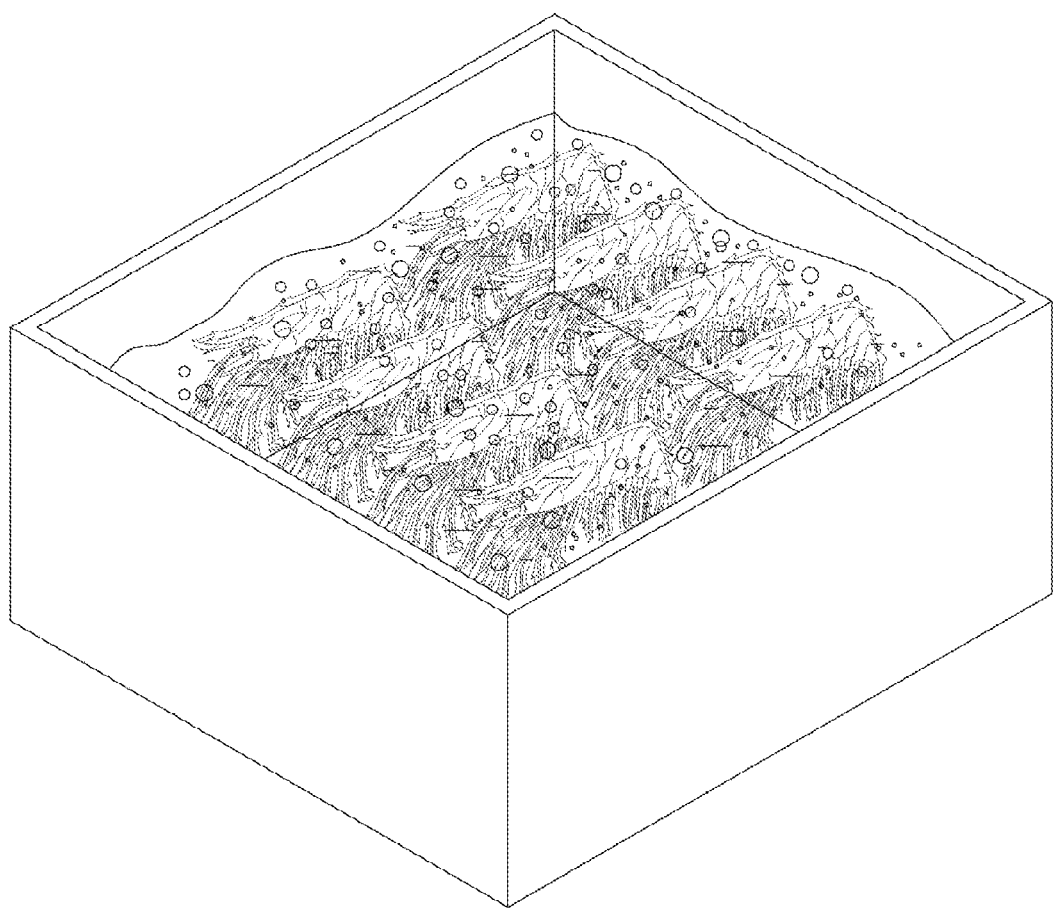
FIG. 5 is a depiction showing that fried objects have a floor area ratio of 80% or less of a section area of a french fry container according to an embodiment of the present invention.
Figure 6:
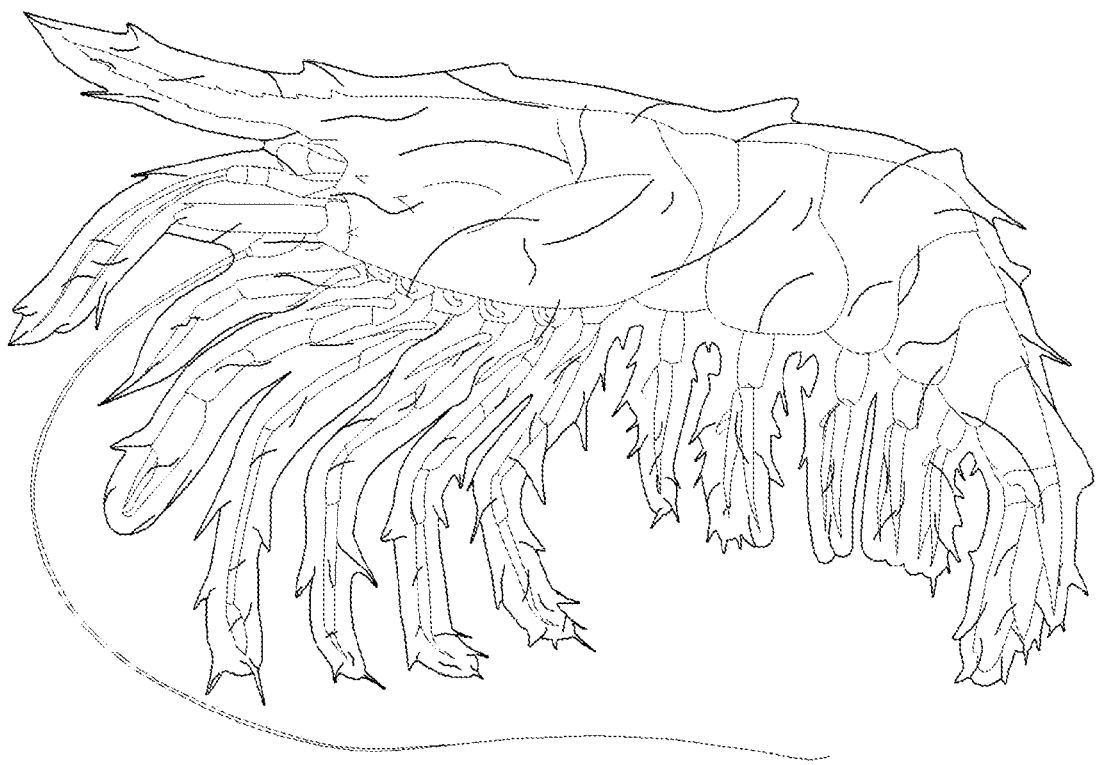
FIG. 6 is a depiction showing a fried shrimp completed according to a frying method in an embodiment of the present invention.

First, FIG. 1 is a view showing main parts of a shrimp, FIG. 2 is a photograph showing second and three processing operations, and FIG. 3 is a photograph showing a fourth processing operation. FIG. 4 is a reference diagram for explaining a fifth processing operation in which a shrimp is introduced into oil according to an embodiment of the present invention. FIG. 5 is a photograph showing that fried objects have a floor area ratio of 80% or less of a section area of a french fry container according to an embodiment of the present invention, and FIG. 6 is a photograph showing a fried shrimp completed according to a frying method in an embodiment of the present invention.

First Processing Operation

In a shrimp, which is a natural or farmed shrimp and processed in operation in which a shell portion in a head part 1 of the shrimp and internal organs (not shown) positioned in the head part 1 and a back portion of an upper part A of a body part thereof, shown in FIG. 1, have been removed; a first processing operation may be performed, in which a plurality of slits are formed in a width direction in a lower portion B (abdominal part) of the body part 2 of the shrimp at a position close to a tail part 4 thereof. The slits may be formed to be cut such that it may facilitate a removal of a water gun part 5 from the shell at the time of a back shell removing process, simultaneously with being spread but without causing an effect in which the tail part of the shrimp curls up while performing a deep frying, thereby maintaining shrimp inherent shape even after completing the frying process. In addition, after the frying process, the tail part of the shrimp may be obtained to have a straightly-spread shape like a shape in a living state, or the like, that is, shrinkage may be prevented with effects in which an outer shape of the shrimp may be shown finely.

Second Processing Operation

In a second processing operation according to an embodiment of the present invention, as shown in FIG. 2(A), a back shell configured of a solid and hard shell covering the body part 2 of the shrimp provided after the first processing operation may be removed. The removal of the water gun part 5 performed at the same time as the removal of the back shell 2' may be performed because the solid and hard shell formed to be like surrounding from an upper part of the body part to both sides of the shrimp may cause to lose shrimp particular flavor or cause an unpleasant feeling in ingesting the fried shrimp due to the hardness in the shell.

The back shell 2' may be easily removed by peeling a middle part thereof since the body part is formed to be protected by a thin membrane thereon. Also, the water gun part 5 positioned in the tail part 4 may be also easily removed through the slits formed in the above-mentioned first processing operation when peeling the back shell.

In the present embodiment, when the hard back shell 2' and the water gun part 5 are removed, it could be appreciated through repetitive works that removing the shell with gloved hands using cotton gloves having a friction force can improve working property in terms of protecting the hands and increasing productivity, rather than with bare hands of a worker, and that rubber gloves having friction force may be more useful.

Furthermore, when the back shell 2' and the water gun part 5 of the shrimp are removed, instead of depending upon only the bare hands or the gloves, simultaneously, any one of frying flour, wheat flour, starch flour, or the like, used as a primary batter may be used to remove the shell, thereby improving more smooth operation.

In addition, as shown in FIG. 2(B), when the back shell 2' was removed using powder flour used as the primary frying batter, it resulted in preventing a slip so as to more smoothly be able to remove the back shell 2' while removing a shell of the shrimp. That is, as the second processing operation is performed at the same time as performing the third processing operation in which the shrimp is coated with the power type of the primary batter, a separate processing operation is not required, whereby the overall processing operation time may be saved. (FIG. 2(C))

In the embodiment of the present invention, the back shell 2' of the shrimp, that is, hard shell and the water gun part, are removed so as not to have inconvenience during ingestion. The second processing operation according to the present embodiment described a case in which the back shell of a shrimp with a hard back shell has been artificially removed, but according to a shrimp, a shrimp which is called a soft shell shrimp and has a soft shell after natural ecdysis from a hard back shell 2' in a growth process, may be gathered.

As described above, since the above-mentioned shrimp having a soft back shell (the outer layer of the skin) does not need to perform a process of peeling the back shell 2' in removing a shell, the third processing operation of coating the shrimp with the powder batter may be directly performed after the first processing operation. Also, the soft shell shrimp may be subjected to a first processing operation in which a plurality of slits are formed in a portion close to a tail part of a body lower part and a third processing operation of coating the shrimp with a powder form of a primary batter at the same time, whereby one processing operation may be reduced. After the processing operations performed at the same time, a liquid state of a secondary batter may be performed to coat the shrimp.

Third Processing Operation

Thereafter, the shrimp passed through the first processing operation described above is subjected to the second processing operation of removing the hard back shell, and then, the shrimp maintained to have the head part 1, the body part 2, and the leg part 3 and the tail part 4 undergoes operation in which the shrimp is coated (covered) with the powder form of the primary batter.

After removing only the back shell 2' in the second processing operation, or in the case of the soft shell shrimp from which a hard back shell has been removed during a natural growth process and thus of being unnecessary for a process of peeling a back shell, when the shrimp is coated with the powder form of the primary batter such as frying flour, flour, starch flour, or the like, the coating process may be performed so as to evenly, entirely distribute the batter particularly in the head part 1 and the respective leg parts 3 thereof. In particular, since a shrimp to be processed is provided with legs shrunk toward abdomen of the body part, the coating operation may be performed with enabling the shrunk legs to be spread out. This may provide relatively high efficiency in obtaining a good shape of shrimp during a frying process. (See FIG. 2(C))

In addition, when peeling the back shell 2', in the process in which the process of removing a back shell by using the primary batter is simultaneously performed, the batter is evenly distributed such that the head part 1, the body part 2, the leg part 3 and the tail part 4 of the shrimp may be entirely coated as described above.

The primary batter according to an embodiment of the present invention may be any one of batter materials for frying only such as flour, starch, frying flour, or the like, sold in the market. In the present embodiment, frying flour of "Bear Brand" of Daehan Flour Mills Co., Ltd. sold in the market has been used.

Here, evenly coating respective portions of the shrimp with the powder batter is to maintain a shape of shrimp itself as it is when a frying process is completed, and also when the shrimp is subsequently coated with a liquid state of the secondary batter, a shape of a fried shrimp as a finished product after the frying process may be maintained as a first state intact by the even distribution of the primary batter, which is a constitution to be protected according to the embodiment of the present invention.

Therefore, a caution to the distribution of the powder batter, in particular, to the head part and a plurality of leg parts, is required. As described above, a shrimp to be processed is generally provided with leg portions in a state of being shrunk toward a body part. In order for the shrimp to be seen to be distinguished with regard to a shape of leg portions after completing a frying process, the coating of the shrimp with the powder form of the primary batter may be performed while enabling the leg portions to be spread out downwardly (B) of the head part, thereby maintaining a shape of shrimp itself, when a frying product, shrimp is introduced into oil and after the frying process is completed.

Further, the batter may be maintained and used in a dried state of having no moisture therein. In a case in which moisture is contained therein, the primary batter may become sloppy due to moisture in the processed shrimp itself and a shape of the shrimp after the frying process may not be clearly provided or the processing may be disturbed.

Also, in a case in which moisture is excessively contained in the primary batter, it may affect a temperature and time in frying.

In the present embodiment, in the processing operation of peeling the back shell 2' of the shrimp, the second and third processing operations may be performed in sequence or performed at the same time, and then, the fourth processing operation of coating the shrimp with a liquid state of the secondary batter may be performed, thereby improving process efficiency.

In a case of the soft shell shrimp in which it does not need to remove the back shell 2', the second processing operation may be omitted, and the first and third processing operations may be performed in sequence or at the same time, to thus perform the fourth processing operation.

Fourth Processing Operation

As described above, respective processing operations are performed sequentially or simultaneously according to characteristics of a shrimp, and the shrimp coated with the primary batter (See FIG. 2(C)) to be fried is subjected to the following fourth processing operation as shown in FIG. 3. In the fourth processing operation, before introducing the shrimp in the french fry container, the processing of coating (soaking) the shrimp with a liquid type of the secondary batter may be performed such that frying oil is not polluted and the coated shrimp is fried in a good state while maintaining a shape of the shrimp as it is. The second batter may be manufactured to be a liquid state by mixing powders such as frying flour, flour, starch flour, or the like, the same as that used as the primary batter, with water.

In the present embodiment, at the time of manufacturing the liquid state of batter, the same frying flour as that used in the third processing operation was used. When representing in weight, water and batter are diluted in the ratio of water 800 g to frying flour 1 kg, that is, 0.8:1, to thus manufacture as a liquid state thereof, but the embodiment of the present invention is not limited thereto. In other words, the ratio of water to frying flour may be optionally added or reduced within each about 20% of the above-mentioned ratio according to temperature and humidity at a working area, to then manufacture it as a liquid state. Thus, a satisfactory result has been obtained.

Further, in matured liquid batter, as time lapses, a component of frying flour or the like is naturally deposited. Thus, the batter is appropriately stirred so that deposited component contained therein is mixed with water before processing operation of coating the shrimp with liquid type of batter is performed. At this time, when it is difficult to smoothly stir the batter, water may be added thereto to then perform the stir therefore. Here, the amount of additionally supplied water is not particularly limited and the amount may be applied thereto as long as dilution is easy while the batter is stirred.

In the process of preparing the liquid type of the secondary batter, the fourth processing operation, additives such as starch, weak flour, solar salt, baking powder, onion flour, garlic flour, pepper flour, or the like, may be added as one or in plural according to the requirement and need of people who ingest food or processing worker, to thus flavor.

According to an embodiment of the present invention, the liquid state of the secondary batter was obtained by putting frying flour in water of a normal temperature (ranging from 15 degrees Celsius to 25 degrees Celsius in the embodiment of the present invention) in the range of the above-mentioned ratio and then stirring it to dilute. Thereafter, the stirred secondary batter is matured (leaving alone) at a normal temperature or in a refrigerated state within in the range of 3 to 9 hours, and then, the liquid state of the matured batter is appropriately diluted and shrimp to be fried is evenly coated (soaked) with the matured secondary batter. Subsequently, the shrimp is introduced into oil from an end part of the head part by acute angle in which the shrimp becomes inclined to the oil as shown in arrow C of FIG. 4, to thus perform an oil process.

Fifth Processing Operation

Then, the secondary liquid batter left alone is coated with the shrimp, and the shrimp to be fried is put into the french fry container having a predetermined size (hereinafter, referred to 'fry container'), which is the process of introducing the shrimp to be targeted for frying into oil.

When the shrimp is introduced into oil, as it was described above that with regard to the leg parts of the shrimp shrunk toward to the body, operation of spreading out the shrunk leg parts may be performed while the shrimp is coated with the powder form of the primary batter in order to attain the subject of the invention described above such that the batter is evenly covered; with such operation, the shrimp may be put into oil so as not to be parallel with a horizontal line of oil but be inclined thereto by acute angle, from an end portion of the head part of the shrimp to contact the surface of oil and then in sequence of the body part and the tail part, as shown in arrow C of FIG. 4. Whereby, the shrunk legs of the shrimp may be spread out due to antagonistic, repulsion force in which oil and legs face each other while the frying process is performed, in a state in which the shrunk leg parts have been straightened.

The frying process may be performed maintaining a shape of a shrimp in a living state as it is by the above-described operation when introducing the shrimp into oil.

The shrimp to be fried may be fried in oil in the fry container at the range of frying oil temperature of from 150 to 250 degrees Celsius at a time of from 2 to 6 minutes. Here, in the oil temperature ranging from 5 degrees to 30 degrees Celsius for the shrimp to be fried, when temperature is relatively low, time may be extended, and when temperature is relatively high, frying time may be reduced. Whereby, shrimp inherent shape and crunch at the time of having a fried shrimp may be maintained as it is.

Here, as an appropriate temperature of frying oil, when the object to be fried has a temperature ranging from 160 to 180 degrees Celsius in a normal temperature, frying time ranged from 3:30 seconds to 4:30 seconds. That is, as described above, when temperature of frying oil is increased, frying time is relatively reduced, and to the contrary, when temperature of frying oil is decreased, frying time is relatively prolonged.

Moreover, in performing the frying in the fry container, when a cross section of the fry container at the time of frying is 100%, the object to be fried has a floor area ratio of 80% or less such that at least space between frying oil and shrimps for frying may be maintained to thus evenly, appropriately apply a frying process to the shrimps.

In more detail, with regard to a cross section of the fry container at the time of once frying, for example, when the cross section of the fry container is 100%, a temperature of a shrimp to be fried is a normal temperature and the floor area of the shrimp to be fried is 10% (in the present embodiment, for example, although one shrimp to be fried has the floor area of 10%, it may become different according to the size of the fry container); there is no great difference with respect to decrease in oil temperature of the fry container, and also, when the shrimp is fried within the range of an appropriate temperature in frying, frying time may be reduced.

Thus, as the floor area ratio of the object to be fried to the cross section of the fry container is increased, temperature of frying oil and frying time may have an influence therefrom. When the floor area ration of the object to be fried is 80% or more, the objects to be fried may be stuck to each other such that frying results according to an embodiment of the present invention may not be obtained. In addition, when there is no a constant redundant space in the fry container, inconvenience or the like in performing the operation of introducing the shrimps into oil by acute angle may be caused. In the frying process, operation of coating a shrimp with batter during frying in oil, generally performed in a frying process, may not be smoothly performed, and due to such defects, when the floor area of the fry container is 100%, the floor area ration of the objects to be fried does not exceed 80%.

As set forth above, according to an embodiment of the present invention, a shrimp may be fried with a shape in a living state thereof as it is, maintaining all portions of a shrimp including a head part and leg parts, whereby all of beneficial nutrients contained in a shrimp may be taken by people who eat a fried shrimp. In addition, since a shrimp is fried as an original state intact thereof without removing a head part and leg parts, people who have a fried shrimp may appreciate flavor of the shrimp in the original state as it is even after frying. Therefore, there may be effects of improvements in sense of taste represented visually and a commercial value provided after the processing.

While the present invention has been shown and described in connection with the embodiments in the exemplary embodiments, it will be apparent to those skilled in the art that modifications and variations can be made without departing from the spirit and scope of the invention as defined by the appended claims.

What is claimed is:

1. A method of frying a shrimp with a shape thereof, to maintain an original shape of the shrimp as it is, in a state in which a shell portion in a head part of the shrimp obtained naturally or in aquaculture and internal organs in the head part and a back part of a body part thereof have been removed, the method comprising:
   a first processing operation of forming a plurality of slits in a lower portion of the body part of the shrimp at a position thereof close to a tail part thereof;
   a second processing operation of removing a back shell of the body;
   a third processing operation of coating the head part, the body part, a plurality of leg parts, and the tail part of the shrimp from which the back shell thereof has been removed, with a powder form of a primary batter;
   a fourth processing operation of coating the shrimp coated with the powder form of the primary batter, with a liquid type of a secondary batter; and
   a fifth processing operation of introducing the shrimp into a french fry container from an end portion of the head part by acute angle when the shrimp coated with the liquid type of the secondary batter is put into the french fry container.

2. The method of claim 1, wherein the second processing operation and the third processing operation are performed at the same time.

3. The method of claim 1, wherein the liquid type of the secondary batter used in the fourth processing operation is matured at a normal temperature or in a refrigerated state for 3 to 9 hours.

4. The method of claim 1, wherein the shrimp is fried in the french fry container at an oil temperature ranging from 150 to 250 degrees Celsius for 3 to 5 minutes.

5. The method as in one of claims 1, 2, 3 and 4, wherein a floor area ratio of the shrimp to be fried is 80% or less of a section area of the french fry container when a frying operation is once performed in the french fry container.

* * * * *